INVENTORS.
HAROLD E. PARSH
GERALD B. HIGDON

BY Morton & Adler

ATTORNEY.

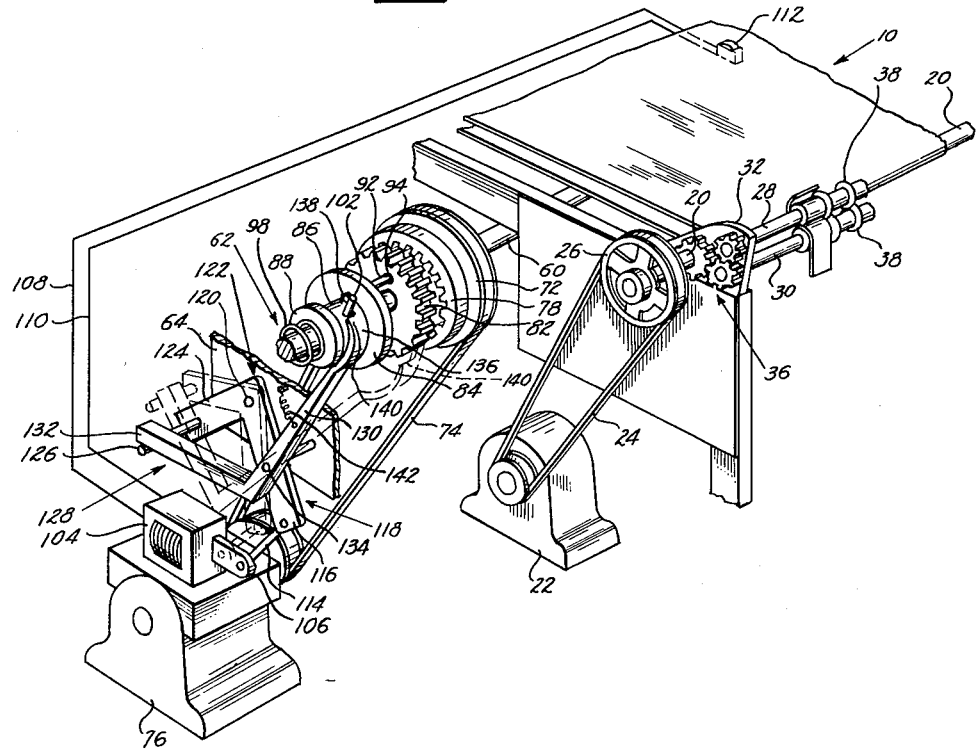

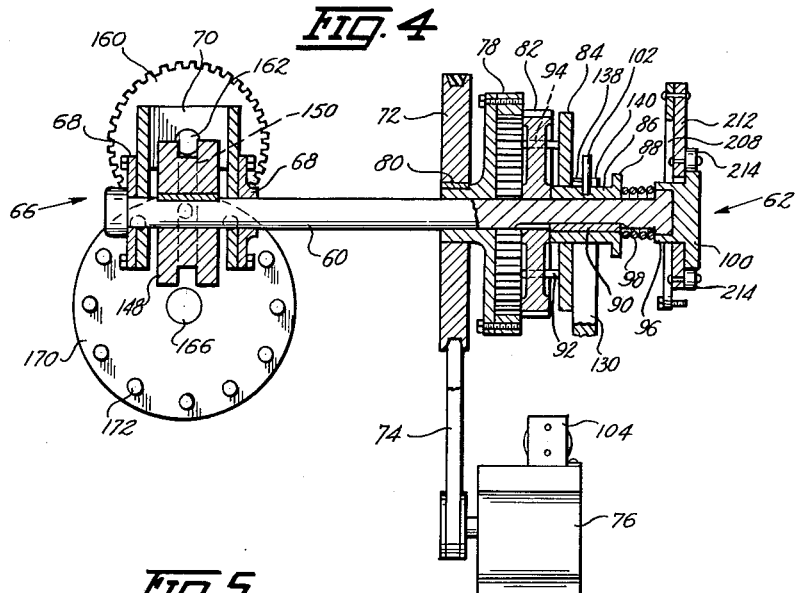
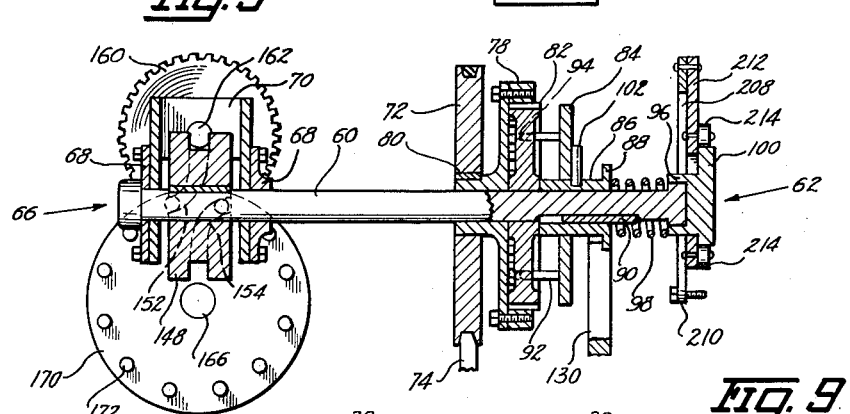
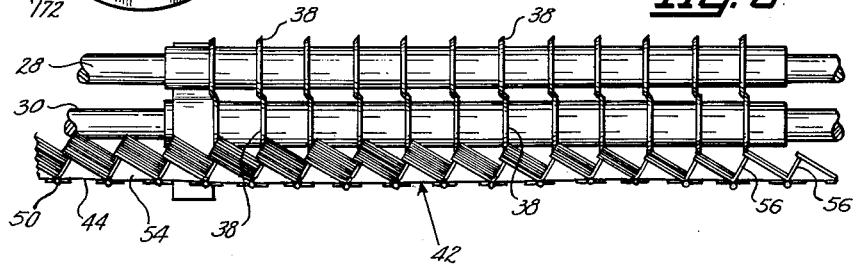
INVENTORS.
HAROLD E. PARSH
GERALD B. HIGDON
BY Morton S. Adler
ATTORNEY.

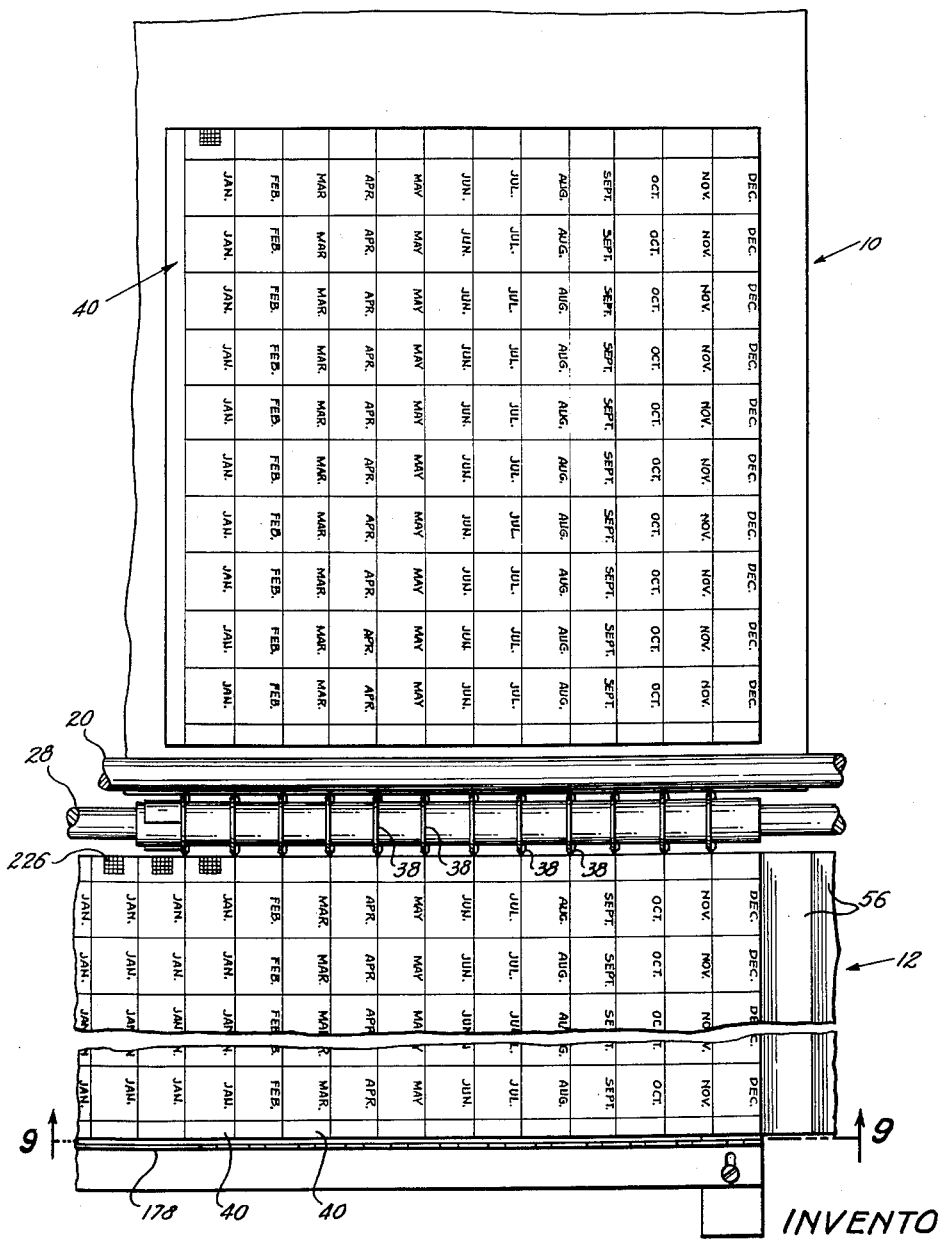

United States Patent Office 3,009,695
Patented Nov. 21, 1961

3,009,695
COLLATING MACHINE
Harold E. Parsh, Box 141, and Gerald B. Higdon,
515 E. 2nd St., both of Newton, Iowa
Filed May 18, 1959, Ser. No. 813,980
6 Claims. (Cl. 270—58)

This invention relates to a collating machine having particular utility in the field of printing and assembly of calendar pads.

Among several important objects to this end it is sought to provide a machine that will automatically assemble printed calendar material into chronological order by months preparatory to gluing or otherwise fastening the same to form a calendar pad for a specified year.

More particularly this invention contemplates the printing of calendar indicia on a single sheet having twelve parallel columns—one for each month—of predetermined length, with all indicia in each respective column being duplicate impressions for a respective month, and by means of my new machine such sheets are cut into twelve strips each containing multiple impressions for a single calendar month with such strips being automatically collected and ultimately dispensed from the collecting apparatus in stacks containing twelve strips consisting of the respective calendar months in chronological order.

Another important object inhering herein is the provision of novel collecting apparatus to accomplish the above purposes.

A further object of our invention is to provide apparatus for receiving the assembled calendar strips from the collecting assembly where it is stacked ready for gluing.

Still another object herein is to employ this collating machine with a suitable conveyor for the printed sheets and providing on such conveyor switch means trippable by such sheets for actuating the collecting apparatus according to a predetermined cycle.

Further objects and the more obvious advantages of this invention will be mentioned or else appear plainly from the description which follows.

Figure 1:
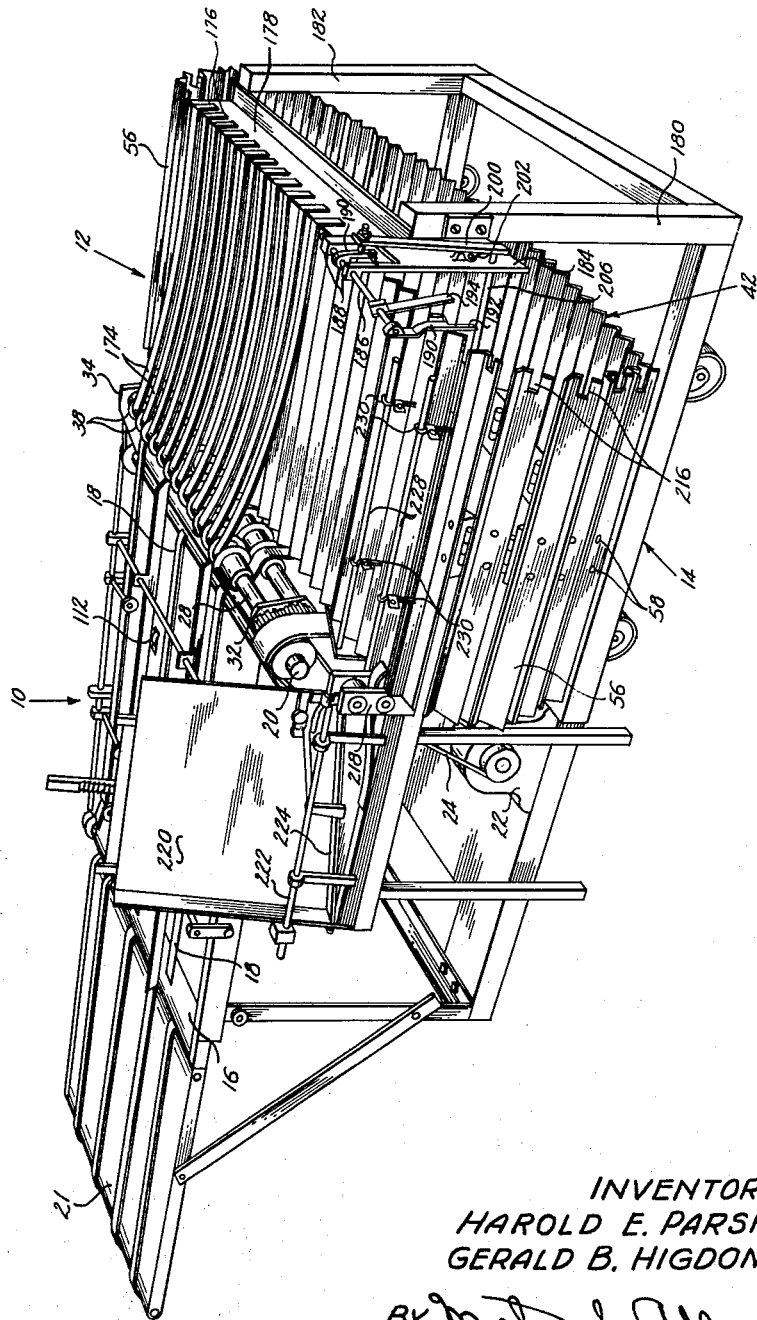
Figure 2:
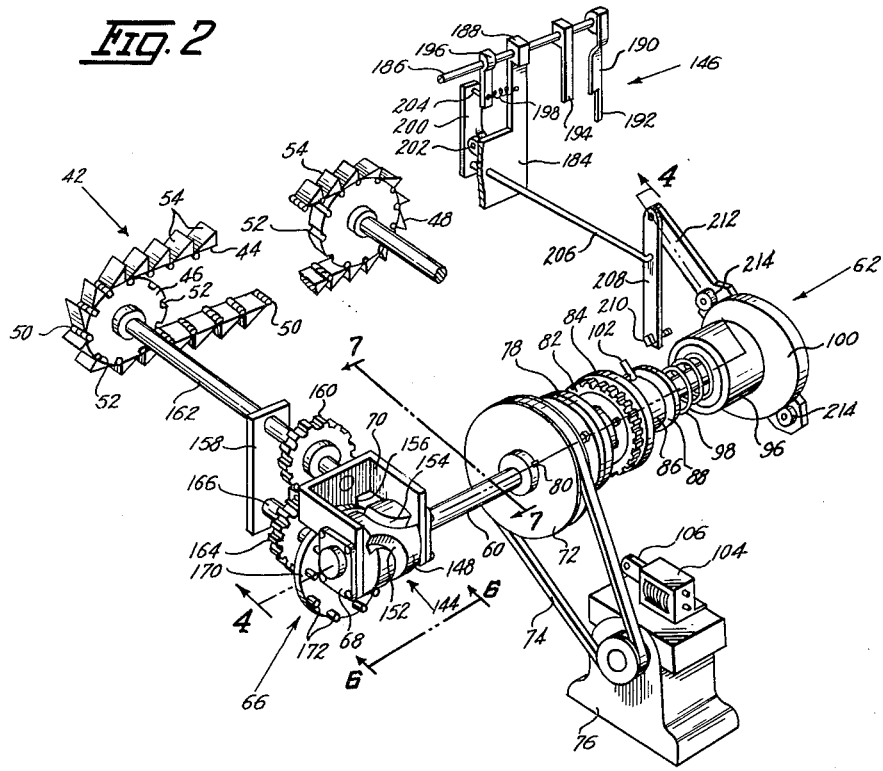
Figure 6:
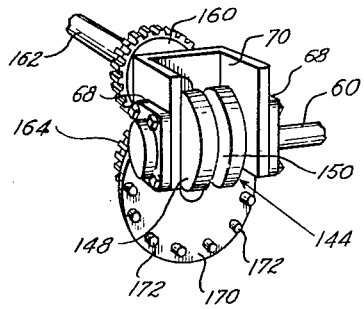
Figure 7:
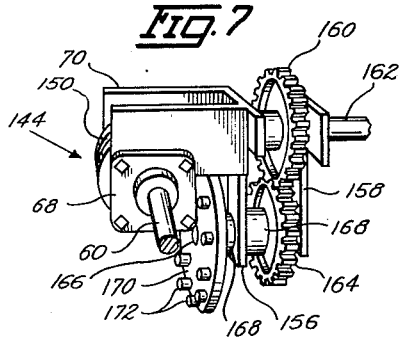

This invention consists of novel parts and combination of parts to be hereinafter described whereby the objects set forth are attained, as pointed out in the claims, and illustrated in the accompanying drawings, in which:

FIG. 1 is a perspective view illustrating a preferred embodiment of this invention, FIG. 2 is a perspective view showing the drum cam mechanism and the clutch assembly together with portions of other parts associated therewith, the clutch being shown in exploded position to better illustrate its construction, FIG. 3 is a fragmentary perspective view showing the opposite side of the clutch assembly relative to FIG. 2 together with the actuating or trip lever arrangement associated therewith and also showing the relative position of the paper conveyor, FIG. 4 is a longitudinal sectional view of the drum cam and clutch assembly taken on the line 4—4 of FIG. 2 and showing the clutch assembly disengaged, FIG. 5 is a sectional view similar to FIG. 4 but showing the clutch assembly engaged, FIG. 6 is an enlarged perspective view of the drum cam assembly taken from the line 6—6 of FIG. 2 to show a different position of the cam from that seen in FIG. 2, FIG. 7 is an enlarged perspective view of the drum cam assembly taken from the line 7—7 of FIG. 2 to more fully illustrate the construction thereof, FIG. 8 is a fragmentary top plan view illustrating the printed calendar on the conveyor and in the collecting trays after passing through the intermediate cutters, and FIG. 9 is an end view of the collecting trays taken from the line 9—9 of FIG. 8.

Referring to the drawings this machine consists of two general sections, namely the paper conveying apparatus 10 and the collating apparatus 12 as seen in FIG. 1. Novelty and invention is claimed particularly as to section 12 as will later appear and section 10 may be of any suitable construction for conveying or feeding paper sheets when associated with section 12 as will be described. Sections 10 and 12 are carried upon a wheeled frame designated generally by the numeral 14 and having suitable legs and braces that will be identified as the description proceeds.

Conveyor 10 includes a platform 16 on one end of frame 14 over which there will run the endless parallel spaced belts 18 trained over shafts at opposite ends of the platform in a well known manner and in FIG. 3 one of such shafts 20 is illustrated, the same being driven by a motor 22 having a belt drive connection 24 to a pulley 26 on one end of shaft 20. A paper supply or stacking shelf 21 may be provided on the receiving end of conveyor 10 as seen in FIG. 1. Shaft 20 is at the discharge end of conveyor 10 and outwardly therefrom but closely adjacent are the vertically spaced parallel shafts 28 and 30 which are parallel to shaft 20 and rotatably journalled in bearing members 32 and 34. Shafts 28 and 30 are rotated in opposite directions relative to each other by a gearing means 36 on bearing member 32 associated with shaft 20 in a well known manner as illustrated in FIG. 3. Coaxially disposed on each shaft 28 and 30 are the longitudinally spaced cutting wheels or discs 38 (FIG. 9) arranged so their perimeters have an overlapping shearing engagement for cutting or slicing a sheet of paper 40 passing therethrough from conveyor 10 as will later be referred to in more detail. Thus far described, conveyor 10 and the cutting discs 38 are in continuous operation when motor 22 is running. No invention is claimed in such structure per se as conveyors and cutting assemblies are not new, but the combination therewith with my collating apparatus 12, and such apparatus itself, affords advantages in calendar production not heretofore available.

The collating apparatus includes an endless conveyor chain assembly 42 disposed outwardly from the discharge end of conveyor 10 and disposed so that chain 44 runs perpendicularly to the direction of conveyor belts 18. A fragmentary portion of assembly 42 is shown in FIG. 2 and it being of well known construction, it will be understood that pulley wheels 46 and 48 will be mounted in suitable bearing means to frame 14. Chain 44 is of the hinge link type in which the hinge pins 50 will mesh with spaced peripheral notches 52 on wheels 46 and 48. For our purposes the exposed surface of chain 44 has been formed into a succession of angularly arranged supporting members 54 each of which has an inclined face at preferably 30°. The spacing between the faces on supports 54 corresponds to the spacing between the cutting discs 38 and this relationship together with the operation of certain gearing as will be explained is determined by the size of the particular calendar involved which will become apparent in the description which follows.

Each support 54 carries an elongated L-shaped light-weight receiving tray 56 preferably of aluminum or the like which is secured to the inclined face thereof in any suitable manner such as the screws 58 at approximately its center portion so that it extends therefrom in two respective opposite directions. With a tray 56 on each support 54 there is in effect a second endless conveyor of receiving trays having their longitudinal axes transversely of the direction of travel of chain 44 and of the longitudinal axes of shafts 28 and 30 but in longitudinal alignment with the direction of travel of belts 18 on conveyor 10. Chain 44, as will be pointed out, is adapted to move one link at a time and at all times intermediate the ends of shafts 28 and 30 one of the trays 56 will be aligned with a space between the cutting wheels 38 (FIG. 9) to receive the cut strips of paper 40 passing therethrough. This operation includes apparatus shown in FIGS. 2–7 which we shall now describe.

Below conveyor platform 16 at any suitable place and preferably below the discharge end, a shaft 60 is disposed generally parallel to shafts 20, 28 and 30 and at one end 62 (FIG. 3) will be journalled in any suitable way to a plate secured to frame 14. The other end 66 (FIG. 2) will be mounted in pillow bearings 68 on opposite sides of the open end of a channel shaped casing 70 supported by portions of frame 14. Casing 70 is laterally spaced from the axis of wheel 46 of the chain assembly 42. A free running pulley wheel 72 is mounted on shaft 60 (FIGS. 2, 4–5) and is operated by a belt drive 74 to a separate motor 76 although it is appreciated and within the purview of this invention that by suitable linkage, pulley 72 may driven by motor 22. Clutch means on shaft 60 includes an external gear member 78 keyed to pulley 72, and for meshing engagement therewith is the internal gear 82 slidably disposed on such shaft. Adjacent gear 82 on the far side relative to gear 78 is a disc shaped flange 84 substantially of like diameter to gear 82 and integral on one end of sleeve 86. A smaller flange or peripheral shoulder 88 is on the other end of sleeve 86. Such sleeve is keyed 90 to shaft 60 and flange 84 is provided with oppositely disposed projecting rods or pins 92 on its face side toward gear 82 for registration with and penetration of holes 94 in such gear so that a positive drive connection is provided. Near end portion 62 of shaft 60 is a collar 96 secured thereto and a coiled expansion spring 98 is mounted on shaft 60 intermediate shoulder 88 and such collar. Integral with the outer end of collar is an eccentrically arranged disc plate 100 which serves as a cam as will later appear and on sleeve 86 there is a radially projecting pin 102.

Thus far described it will be understood that the expansion of spring 98 moves sleeve 86 keyed to shaft 60 so as to place gear 82 into meshing engagement with gear 78 which is keyed to the free running pulley 72 to cause rotation of shaft 60. The engaged position of such clutch assembly is shown in FIG. 5 and the disengaged position obtained by compression of spring 96 is shown in FIG. 4. The clutch assembly described is constructed to operate in response to actuation means that permits only one complete revolution of shaft 60 each time the clutch means is engaged as shown in FIG. 5 and this is accomplished as follows.

With reference now more particularly to FIG. 3, the clutch is actuated and deactuated by means of a spring loaded solenoid 104 of a well known type having the operating arm 106 normally in extending or projecting position as shown in solid lines. Solenoid 104 is electrically connected by leads 108 and 110 to a sensitive spring loaded depressible switch means 112 mounted in the platform 16 of conveyor 10 so as to project above the surface thereof. Depression of switch 112 will close the circuit of leads 108 and 110 which it is understood will be connected to a supply of electric current (not shown). Switch 112 is constructed so that it is depressed by the weight of a sheet of paper 40 passing over it, and as soon as each sheet has cleared this switch, it will return by spring action to its elevated position to open lines 108 and 110.

The solenoid arm 106 is connected by a rigid link 114 to the end of one arm 116 of an inverted L-shaped trip lever 118 which is pivotally attached to frame member 64 by a pin 120 at the junction point 122 with lever arm 124. From the free end portion of lever arm 124 there is a trip bar or rod 126 projecting laterally therefrom in a horizontal plane. A second trip lever 128 inversely positioned as viewed in FIG. 3 includes the upper arm 130 and lower arm 132 and is pivotally attached to frame portion 64 near the lower portion of arm 130 by pin 134. The upper portion of lever arm 130 is arcuate in shape as indicated at 136 conforming to the curvature of sleeve 86 and is designed to engage a portion of the perimeter of such sleeve as shown. The free extremity of the curved portion 136 of arm 130 has a projecting cam finger 138 defining an inclined surface from its outer end to a shoulder 140 in portion 136. A spring 142 connects arm 130 to frame portion 64. In operation with switch 112 open, solenoid arm 106 is extended so that trip lever 118 is in the solid line position of FIG. 3 with trip bar 126 projecting below and in contact with the outer end portion of arm 132 on lever 128. Spring 142 holds arm 130 of lever 128 so that the arcuate portion 136 partially embraces sleeve 86 and pin 102 on sleeve 86 is abutting shoulder 140. In this position pin 102 is held toward end 62 of shaft 60 so that spring 98 is compressed and gear 82 is disengaged from gear 78 so that shaft 60 is not moving. As a sheet of paper 40 passes over switch 112 to close the circuit in leads 108 and 110, solenoid 104 is actuated causing arm 106 to retract. This pulls trip lever 118 to the broken line position in FIG. 3 elevating trip rod 126 which in turn elevates arm 132 of lever 128. As this occurs, lever 128 pivots on pin 134 so that the arcuate portion 136 of arm 130 moves outwardly from sleeve 86 shown in broken lines in FIG. 3 so that finger 138 is no longer adjacent pin 102 whereby spring 96 can expand and move sleeve 86 together with flange 84 which in turn puts gear 82 into meshing engagement with gear 78 so that shaft 60 will rotate. Paper 40 will clear switch 112 before shaft 60 has made one complete revolution and as soon as switch 112 opens the circuit, solenoid arm 106 is extended by the internal spring (not shown) to move lever 118 back to the solid line position in FIG. 3. This permits spring 142 to pull arm 130 of lever 120 so that the curve portion 136 is back to the solid line position in FIG. 3. Thus as sleeve 86 completes one revolution with shaft 60, pin 102 engages finger 138 and is biased toward end 62 of shaft 60 until it comes to rest against shoulder 140 at which time this biasing movement has disengaged gear 82 from gear 78 and compressed spring 98 to the position sown in FIG. 4. This operation is completed each time a sheet of paper 40 passes over switch 112 and provides a novel operation of the drum cam assembly 144 on end 66 of shaft 60 and the cam 100 on shaft end 62 as will be apparent from the description which follows.

Referring now more particularly to FIGS. 2, 6–7, the drum cam assembly 144 shown is designed to move the chain assembly 42 one link each time shaft 60 rotates one full turn and is particularly constructed so that movement of assembly 42 is completed in approximately the initial quarter revolution of shaft 60 and the remaining rotation of shaft 60 in its one revolution operates cam 100 which in turn actuates certain strip aligning means designated generally at 146 as will become apparent.

Mounted on shaft 60 for rotation therewith and within casing 70 is a relatively wide disc shaped member which we refer to as a drum cam 148. This cam is provided with a peripheral track or slot 150 that is coaxially arranged over the major distance of the circumference of cam 148 (FIG. 6) but as shown in FIG. 2, such track is not continuous as opposite ends thereof terminate in the respective curved paths 152 and 154 which run in respective opposite directions to communicate with respective opposite sides of cam 148. Such curves 152 and 154 represent approximately a 45° turn from track 150 and both curves are in the same 45° segment of cam 148. Depending from the closed end of casing 70 (FIG. 7) is a support plate 156 and spaced outwardly therefrom is a second support member 158. Intermediate the upper ends of supports 156 and 158 a gear wheel 160 is mounted on shaft 162 for rotation therewith and such shaft extends to chain drive wheel 46 which is also mounted thereon for rotation therewith. Below gear wheel 160 is a second gear wheel 164 in meshing engagement therewith and mounted to a shaft 166 between supports 156 and 158. Shaft 166 extends through support 156 in a suitable bearing 168 and carries a disc-shaped actuating plate 170 having a plurality of concentrically arranged equally spaced projecting lugs 172 for cooperation with the drum cam 148 as follows.

As viewed in FIG. 2 shaft 60 will revolve counterclockwise and cam 148 and plate 170 are adjusted so that when shaft 60 is stationary, one of the lugs 172 on plate 170 is in track 150 about to be engaged by the exit curved portion 154. When switch 112 is tripped and shaft 60 put into rotation by the clutching means previously described, drum 148 will rotate with shaft 60 and the curve 154 of track 150 effects a cam action on the lug 172 therein causing plate 170 to rotate until the lug 172 passes out of curve 154 which accounts for approximately one quarter of the revolution of the shaft 60. Rotation of plate 170 will of course turn gear wheels 160 and 162 to turn chain drive wheel 46 in an obvious manner. Since the open ends of track curves 152 and 154 are oppositely disposed and the distance between the same corresponds to the distance between lugs 172, curve 152 will engage a lug 172 adjacent the lug engaged by curve 154 and carry it into the portion of track 150 that is coaxial with drum 148. Thus after the first lug has cleared curve 154 affecting the turning of plate 170, track 150 rides freely past the second lug just engaged by curve 152 until shaft 60 is stopped by opening of switch 112 as described, at which time such second lug 172 is in position for engagement by curve 154 and the cycle is thus repeated each time switch 112 is closed. The number of lugs 172, their spacing, and the size of gear wheels 160 and 164 are calculated to move the chain assembly 42 carrying trays 56 a distance equal to the spacing between cutters 38. This, as pointed out, is merely a matter of adjustment depending upon the size of the calendars being assembled.

Paper 40 is printed from a plate (not shown) that can be set up according to well known practices so that the width of the paper is divided into twelve columns containing the respective calendar months in chronological order as shown in FIG. 8. The length of the sheet used is a matter of choice and will determine the number of like calendar months printed in each column. Also the length of the sheets will be determined by the size of the equipment used and the length of the trays 56. For our purposes we have designed this machine particularly for what is known as inch and a half calendars and it will be understood that the same can be accommodated to other sizes by making adjustments obvious to a skilled mechanic upon reading this description. With conveyor 10 and cutting members 38 in operation, paper 40 is fed from shelf 21 or the like either manually or automatically onto the conveyor. Many automatic paper feeding devices are commercially available and while no invention is claimed for such apparatus, we appreciate that they may be employed to some advantage with our machine under some circumstances. As paper 40 moves through the cutters 38, it is cut or sliced into elongated strips each of which is imprinted with a plurality of impressions of a single calendar month. Such cut strips will simultaneously drop into the respective tray 56 in line with the longitudinal path of each strip as shown in the lower portion of FIG. 8. Thus after the first sheet 40 has been cut, twelve trays 56 will each hold a respective strip of multiple impressions of the same month in chronological order from left to right as seen in FIG. 9. The passage of the first sheet 40 over switch 112 will of course have actuated solenoid 104 to rotate shaft 60 so that trays 56 are moved one space relative to the spaces between cutters 38 and as the second sheet 40 comes through the cutters, the December strip will fall into an empty tray, the November strip will fall on top of a December strip, October on a November strip, etc. Initially, of course, it will take twelve sheets 40 before the first complete stack of twelve strips reaches the discharge end of trays 56 shown at the near side of FIG. 1 and the first few stacks of less than twelve strips can be discarded or otherwise utilized as desired. During this collating operation, we have found that inclining trays 56 as shown in FIG. 9 reduces materially the tendency of the flexible strips to flutter and otherwise not properly stack in the trays. In addition we have placed paper guards in the form of elongated flexible bar-like strips 174 (FIG. 1) which extend longitudinally over the position of each tray 56 receiving the cut strips from sheet 40. Such guards 174 are bent at each end to form hooks 176 with one hook 176 on each guard removably engaged on cutter shaft 28 between a respective pair of cutters 38 and the hook 176 on the other end engaged over a cross bar 178 extending between spaced upstanding legs 180 and 182 of frame 14. These guards provide in effect a cover over the trays receiving paper and aid in eliminating the displacement of the strips from the tray intended to receive them.

As trays 56 move past the cutters 38 and eventually contain a complete stack of calendar strips as described, they must be removed from the trays for gluing and cutting into individual calendar pads. The removal of the strips from trays 56 and the stacking of the same preparatory for gluing and cutting is accomplished by our machine as follows. The aligning means 146 (FIG. 2) includes a plate 184 secured to frame leg 180 at the discharge end of the conveyor trays 56 and at its upper end carries a rod 186 rotatably journalled in spaced bearing ears 188, said rod 186 extending from plate 184 transversely of the longitudinal axes of trays 56. On the extended end of rod 186 corresponding to the discharge end of trays 56 there is a depending pusher lever 190 having a terminal finger member 192. Lever 190 is rotatable with rod 186 as is a depending paper tapping lever 194 on such rod that is spaced from lever 190. Both of these levers depend to a point adjacent one end of trays 56 as shown. Intermediate ears 188 a depending actuating lever 196 is mounted to rod 186 for rotation therewith and the lower end of lever 196 is connected to plate 184 by a spring 198 so that lever 196 is normally pushed outwardly from such plate which holds rod 186 in a position where members 190 and 194 are likewise normally rotated or tilted away from the ends of trays 56. It will thus be appreciated that by moving lever 196 against spring 198, levers 192 and 194 are moved toward trays 56. To do this, lever 196 is engageable by an elongated vertical arm 200 pivotally secured intermediate its ends as at 202 to plate 184. Pivot 202 is near the lower end of arm 200 so that normally such arm rests by its own weight with the upper end inclined outwardly from lever 196. Such upper end of arm 200 is provided with an adjustable contact lug 204 for proper contact adjustment with lever 196. At the lower end of arm 200 a rod 206 is connected thereto and slidably passes through plate 184 for connection to lever 208 which in turn is pivotally connected at one end 210 to any suitable portion of frame 14. The other end of lever 208 is pivotally attached to an end of arm 212 rollably connected to cam 100 by means 214. Thus described assembly 146 is operated by cam 100 and functions as follows.

After trays 56 have been moved by the drum cam assembly 144 in the first quarter turn of shaft 60 as described, shaft 60 in completing its full revolution turns cam 100. Thus, after trays 56 have stopped, the linkage between cam 100 and arm 200 through members 212, 208 and 206, pushes the lower end of arm 200 outwardly so that the upper end depresses lever 196 against spring 198. This rotates rod 186 so that members 194 and 190 move toward trays 56. In this operation, lever 194 is positioned to first tap or tamp the stack of calendar strips in the adjacent tray 56 in much the same fashion as one taps a stack of paper on a table to align the edges. Such tamped stack is ready for discharge from trays 56 after the next movement of the trays. Each tray 56 has an end slot 216 (FIG. 1) on the end passing adjacent lever 190 and finger 192 on lever 190 moves into slot 216 in the tray in discharge position pushing the entire stack into a receiving roller assembly 218 shown in FIG. 1 which deposits them in a receptacle 220 which is designed to accumulate a stack of strips from a considerable number of trays 56. As cam 100 completes its revolution with shaft 60, levers 190, 194 and 196 are returned to their normal or starting position. Various paper hold down means 222 and 224 may be employed with receptacle 218 in an obvious manner. From time to time the receptacle 218 can be emptied and the strips glued in a manner well known in the art. The January column of sheets 40 are labeled or otherwise identified as at 226 in a well known manner to facilitate separation of the glued strips.

Roller assembly 218 can be operated in any suitable manner and we have used a small separate motor (not shown) for this purpose. We have also placed guide rods 228 with pivotal hold down fingers 230 over the discharge end of trays 56 to aid in guiding the strips into the roller assembly 218. Such rods 228 are attached to portions of frame 14.

From the foregoing description it will be appreciated that we have invented a most useful and efficient machine to accomplish the objects set forth. This collator can be arranged, if desired, to automatically receive sheets 40 directly from a printing press so that the entire operation of printing, cutting, and collating can be automatically accomplished. And even when used independently of a printing press, this machine has demonstrated a substantial savings in time and cost over collating methods previously employed for these purposes.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:

1. A collating machine, comprising a paper conveyor including a paper cutting means for cutting a sheet of paper into a plurality of parallel strips and simultaneously ejecting said strips, an endless conveyor arrangement of elongated parallel spaced receiving trays disposed so that each ejected strip will fall into a different respective tray, a shaft, means for supporting the same, an electric motor connected to a free running pulley on said shaft, clutch means on said shaft engageable with said pulley at times, a solenoid connected to said clutch means for actuating and deactuating the same, normally open switch means on said conveyor electrically connected to said solenoid, said switch trippable by the weight of a sheet of paper passing over it, said clutch means responsive to said solenoid to engage said pulley and to limit said shaft to a single complete revolution each time said switch is closed, and one end of said shaft carrying a cam assembly operatively connected to said receiving trays whereby said trays are moved a predetermined distance each time said motor is actuated, a second cam on the other end of said shaft, and a lever connected to and operated by said second cam for tamping the end of a stacked strip in a specified tray into stacked alignment.

2. A collating machine, comprising a paper conveyor including a paper cutting means for cutting a sheet of paper into a plurality of parallel strips and simultaneously ejecting said strips, an endless conveyor arrangement of elongated parallel spaced receiving trays disposed so that each ejected strip will fall into a different respective tray, a shaft, means for supporting the same, an electric motor connected to a free running pulley on said shaft, clutch means on said shaft engageable with said pulley at times, a solenoid connected to said clutch means for actuating and deactuating the same, normally open switch means on said conveyor electrically connected to said solenoid, said switch trippable by the weight of a sheet of paper passing over it, said clutch means responsive to said solenoid to engage said pulley and to limit said shaft to a single complete revolution each time said switch is closed, one end of said shaft carrying a cam assembly operatively connected to said receiving trays and so constructed and arranged that only during the initial partial distance of rotation of said shaft each time said clutch means is engaged it acts to move said trays a predetermined distance and does not act upon said trays during the balance of the complete revolution of said shaft, and the other end of said shaft carries a second cam means operatively connected to a lever movable by said second cam means for tamping the ends of the stacked strips in a specified tray into a stacked alignment after said tray has come to rest.

3. A collating machine, comprising a paper conveyor including a paper cutting means for cutting a sheet of paper into a plurality of parallel strips and simultaneously ejecting said strips, an endless conveyor arrangement of elongated parallel spaced receiving trays disposed so that each ejected strip will fall into a different respective tray, each tray provided with an elongated notch in one end, a supported shaft operatively connected to said trays for moving the same relative to said paper cutting means, means for rotating said shaft, switch means on said paper conveyor actuated by the weight of paper passing over it and operatively connected to said means for rotating said shaft, a cam on one end of said shaft, a movable lever connected to said cam and movable thereby to penetrate the notch of one of said trays and push the stack of strips longitudinally thereof, and revolving rollers disposed to engage such pushed stack of strips for removing them from said tray.

4. In a collating machine of the type including a paper cutting means for cutting a sheet of paper into a plurality of parallel strips and simultaneously ejecting said strips, an endless conveyor arrangement of elongated parallel spaced receiving open end trays disposed so that each ejected strip will fall into a different respective tray, and means synchronized with the cutting of each successive sheet of paper to move said trays so that each successive strip received by each tray will be from a position adjacent to that of the preceding strip to form a stack of strips in a predetermined order, the combination therewith of a tamping lever disposed so that one end of each tray moves past the same, and said lever connected to said synchronized means and intermittently movable thereby so as to effect a tamping action against one end of each stack of strips for aligning the same.

5. In a collating machine of the type including a paper cutting means for cutting a sheet of paper into a plurality of parallel strips and simultaneously ejecting said strips, an endless conveyor arrangement of elongated parallel spaced receiving open end trays disposed so that each ejected strip will fall into a different respective tray, the combination therewith of a supported shaft operatively connected to said trays for moving the same relative to said paper cutting means, means for rotating said shaft, each tray having an elongated notch in one end, a cam on one end of said shaft, a pair of spaced movable levers each connected to and movable by said cam, one of said levers when moved effecting a tamping action against the ends of the stacked strips, the other lever movable into the notch in one of said trays to push said stacks of strips longitudinally thereof, and revolving rollers disposed to receive said pushed stacks of strips and remove them from said trays.

6. In a collating machine of the type including a paper cutting means for cutting a sheet of paper into a plurality of parallel strips and simultaneously ejecting said strips, an endless conveyor arrangement of elongated parallel spaced receiving open end trays disposed so that each ejected strip will fall into a different respective tray, the combination therewith of a supported shaft operatively connected to said trays for moving the same relative to said paper cutting means, means for rotating said shaft, each tray having an elongated notch in one end, a cam on one end of said shaft, a lever connected to and movable by said cam, said lever movable into the notch in one of said trays to push said stacks of strips longitudinally thereof, and revolving rollers disposed to receive said pushed stacks of strips and remove them from said trays.

References Cited in the file of this patent

UNITED STATES PATENTS

| | | |
|---|---|---|
| 121,117 | Mauger | Nov. 21, 1871 |
| 498,552 | Hunt | May 30, 1893 |
| 959,644 | Sullivan | May 31, 1910 |
| 1,702,763 | Clark | Feb. 19, 1929 |
| 2,352,926 | Weiss | July 4, 1944 |
| 2,432,133 | Babicz | Dec. 9, 1947 |
| 2,561,070 | Phythian | July 17, 1951 |
| 2,879,991 | Pitner | Mar. 31, 1959 |